United States Patent [19]
Lembke

[11] Patent Number: 4,489,627
[45] Date of Patent: Dec. 25, 1984

[54] RAZORS AND SHAVING UNITS FOR RAZORS

[75] Inventor: Max A. Lembke, Greenford, England

[73] Assignee: Wilkinson Sword Limited, England

[21] Appl. No.: 342,278

[22] Filed: Jan. 25, 1982

[30] Foreign Application Priority Data

Jan. 21, 1981 [GB] United Kingdom ............... 8101769

[51] Int. Cl.³ .................................................. B21K 11/00
[52] U.S. Cl. .............................. 76/104 R; 76/DIG. 8; 30/32
[58] Field of Search ................. 76/104 R, DIG. 8; 30/32, 77, 78

[56] References Cited

U.S. PATENT DOCUMENTS 3,070,883  1/1963  Grathwohl ........................... 30/32
3,362,068  1/1968  Loewy ................................. 30/77
3,703,766  11/1972 Tibbals .............................. 76/104 R

FOREIGN PATENT DOCUMENTS 1450837  7/1966  France ................................. 30/32

Primary Examiner—Roscoe V. Parker
Attorney, Agent, or Firm—John K. Williamson

[57] ABSTRACT

A double edged strip of blade metal is parted along a center line and cropped to form two strips each containing a series of spaced apart blades connected by webs to an elongate backing strip of blade metal. Each strip is fed into a moulding machine in which a razor, or a shaving unit, or a blade-containing component of a shaving unit is moulded directly on to each individual blade. Each web is then parted to release the moulded razor, shaving unit, or shaving unit component, from the backing strip.

4 Claims, 10 Drawing Figures

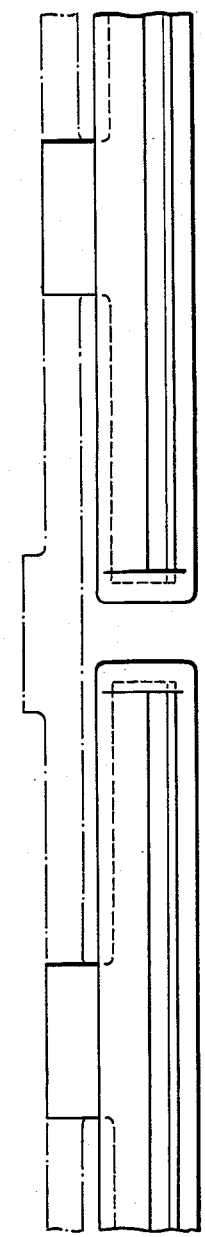
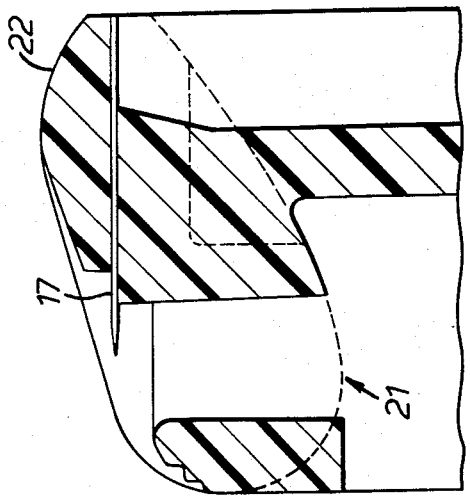
FIG. 3.
FIG. 4.

RAZORS AND SHAVING UNITS FOR RAZORS

BACKGROUND OF THE INVENTION

This invention relates to razors. More particularly the invention relates to a process for the manufacture of razors and of shaving units for incorporation in razors.

BRIEF SUMMARY OF THE INVENTION

According to one aspect of the present invention there is provided a process for the manufacture of razors or shaving units for razors, which comprise forming a strip of blade metal with at least two cutting edges, introducing the strip into a mould cavity and moulding plastics material directly on to the strip to form the plastics portion of a razor or shaving unit on each cutting edge or on both cutting edges, the plastics portions being spaced apart, and cropping at least part of the blade metal which interconnects the cutting edges to release the razors or shaving units from each other.

According to another aspect of the present invention there is provided a process for the manufacture of razors or shaving units for razors, which comprises introducing a double-edged strip of blade metal into a mould cavity, moulding the plastics portion of a separate razor or shaving unit on to each edge of the strip and cropping out the portion of the blade strip between the two razors or shaving units.

BRIEF DESCRIPTION OF THE DRAWINGS

Some forms of the manufacturing process in accordance with the invention will now be described by way of example only, with reference to the accompanying drawings in which:

FIG. 3 is a plan view showing two shaving units which have been moulded on to a strip of blade metal;

FIG. 4 is a section through the head or shaving unit of a razor made by a process according to the invention;

DETAILED DESCRIPTION

Figure 1:
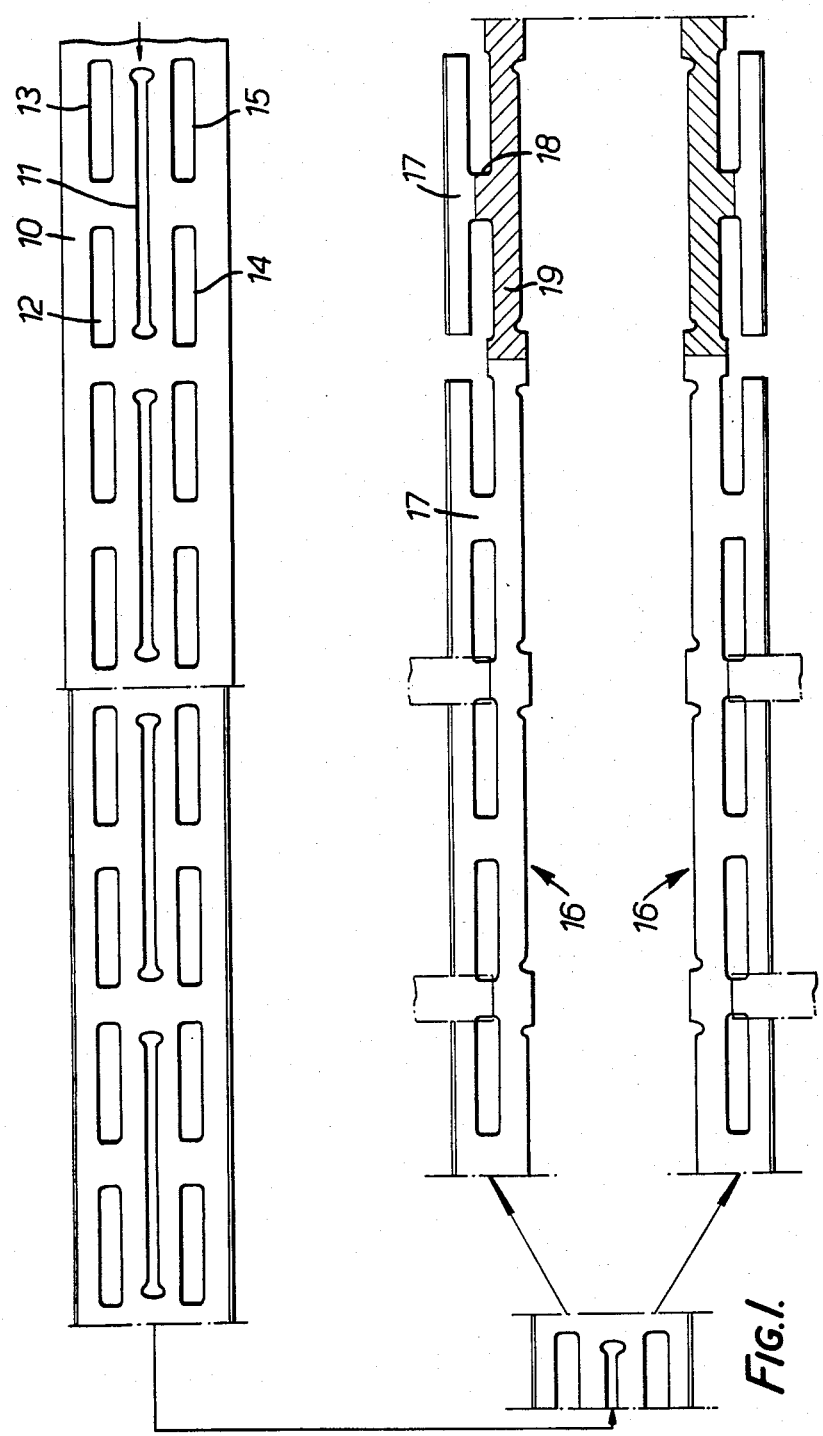
FIG. 1 is a diagrammatic plan view of a strip of blade metal containing perforations to facilitate parting of individual blades from the strip and illustrating the steps of slitting and cropping the strip to produce individual blades.

The process first to be described is designed for the manufacture of shaving units for incorporation in razors or for the manufacture of one piece disposable razors, the latter being razors which can be thrown away when the user decides that he is no longer obtaining a satisfactory shave.

The strip of blade metal from which the blades, or shaving units, are to be manufactured is similar to that used in the production of doubled edged blades and can, therefore, utilise similar machinery to that used in the manufacture of double edged razor blades. This machinery provides a strip of blade metal 10 having spaced-apart central slots 11 extending along the center line of the strip and two rows of shorter slots 12, 13 and 14, 15 spaced apart along lines approximately midway between the centre line and the edges of the strip.

In a first stage of the process, the strip 10 is ground and stropped along its opposite edges to form two opposed blade edges.

In a second stage of the process, the double edged strip is slit along its longitudinal axis to form two separate single blade-edged strips 16. Each single-edged strip is then cropped between alternate slots 12, 13 and 14, 15 in a third stage of the process to leave a series of separate and spaced apart blades 17 each supported by a narrow web 18 on a continuous strip of blade metal 19. The strip 19 is the portion of the original perforated blade strip 10 which lay between the slot 11 and slots 12, 13 on one side of the blade strip or between the slot 11 and slots 14, 15 on the opposite side of the blade strip 10.

Figure 2:
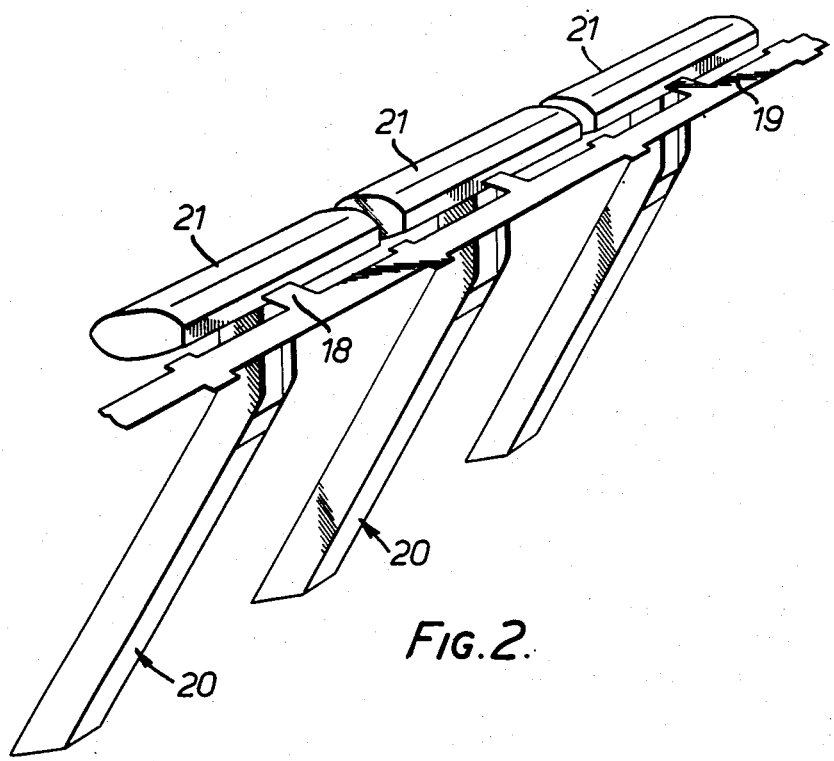
FIG. 2 is a diagrammatic perspective view of a set of three razors which have been moulded on to the blade-forming portions of a cropped strip of blade metal.

The interconnected series of blades 17 is then passed into a moulding machine, the details of which form no part of the present invention, wherein a separate shaving unit, comprising a guard bar and top cap, or a razor comprising a shaving head and integral handle, is moulded around each individual blade 17. FIG. 2 shows an interconnected series of razors 20 which has been produced in the moulding machine, the heads 21 of the razors being attached by the webs 18 to the continuous strip of blade metal 19. In this case, entire razors are formed, but equally shaving units, corresponding to the heads 21 alone, could be moulded on to the blade strip.

It will be seen from FIG. 3 that the plastics moulding of each shaving unit or razor head covers the ends of each blade, and the only part of the blade material projecting therefrom is the web 18.

In a final stage of the process, the webs 18 are cropped to separate the razors 20 from the blade strip 19.

It will be seen from FIGS. 3 and 4 that the top cap 22 of the moulding of the razor head or shaving unit which lies above the blade can overhang the web portion 18 of the blade strip so that, when this web portion is parted off, the raw metal edge remaining in the razor or shaving unit will not represent any hazard to the user.

Figure 5:
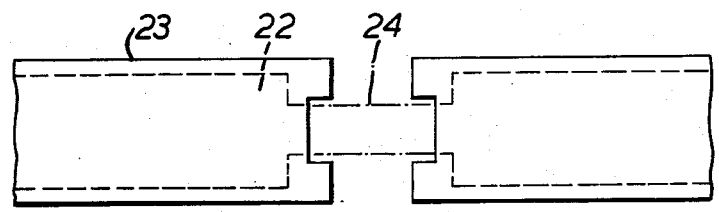
FIG. 5 is a plan view of an alternative form of blade strip on which blade, or shaving units, have been moulded.

Alternatively, in a modification of the process described above, and as illustrated in FIG. 5, individual blades 22 in the razors or shaving units 23 can be connected together end to end by webs 24 which form part of the strip and extend between the end of one blade and the adjacent end of the next blade, the width of each web being substantially less than the width of the strip. The moulding of the razor head or shaving unit can then be such as to provide a recess at opposite ends of the razor head or shaving unit through which the webs extend, each recess being wider than the width of the web. Consequently, when the webs are sheared, the exposed metal edge at each end of each blade will lie within this recess and again present no hazard to the user of the razor.

Figure 6:
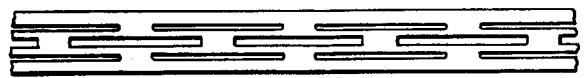
FIG. 6 is a plan view of a blade strip having an alternative form of perforation suitable for use in a process in accordance with the present invention.

Another form of perforated blade strip suitable for use in the present invention is illustrated in FIG. 6.

In accordance with another embodiment of the invention, the moulds of the moulding machine can be formed to produce a series of shaving units capable of being mounted on a razor handle. Each shaving unit can be parted from the blade strip to leave one or more tongues of blade metal projecting from the shaving unit, rearwardly or laterally.

Figure 7:
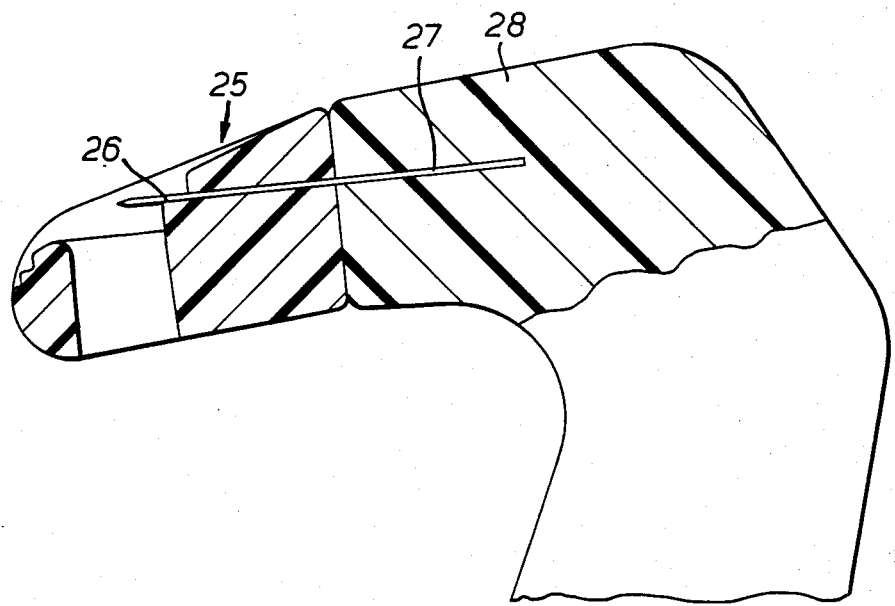
FIG. 7 is a section through a shaving unit, in accordance with the invention, mounted on a razor handle.

Thus, as shown in FIG. 7, the shaving unit 25 is provided with a blade 26 and a rearwardly-extending tongue 27 which engages in a razor handle 28. In particular, the razor handle 28 is moulded on to the tongue 27 to form a one piece disposable razor.

Although the invention has been illustrated in relation to a razor or shaving unit containing a single blade, the razor or shaving unit could equally contain twin blades. This could be achieved by feeding two blades strips into the moulding apparatus simultaneously, one strip being located above the other and with a spacing therebetween, at the point at which moulding takes place, corresponding to the spacing between the blades in the finished razor or shaving unit. Alternatively, one blade strip could have a razor guard bar and blade spacer moulded on each blade of the strip and a second blade strip could have a razor cap moulded on each blade of the strip. After parting off the individual blades from the strip, mouldings from each strip could then be united in pairs to form twin bladed shaving units, or twin bladed razors if handles were also moulded to one of the blade strips.

Figure 8:
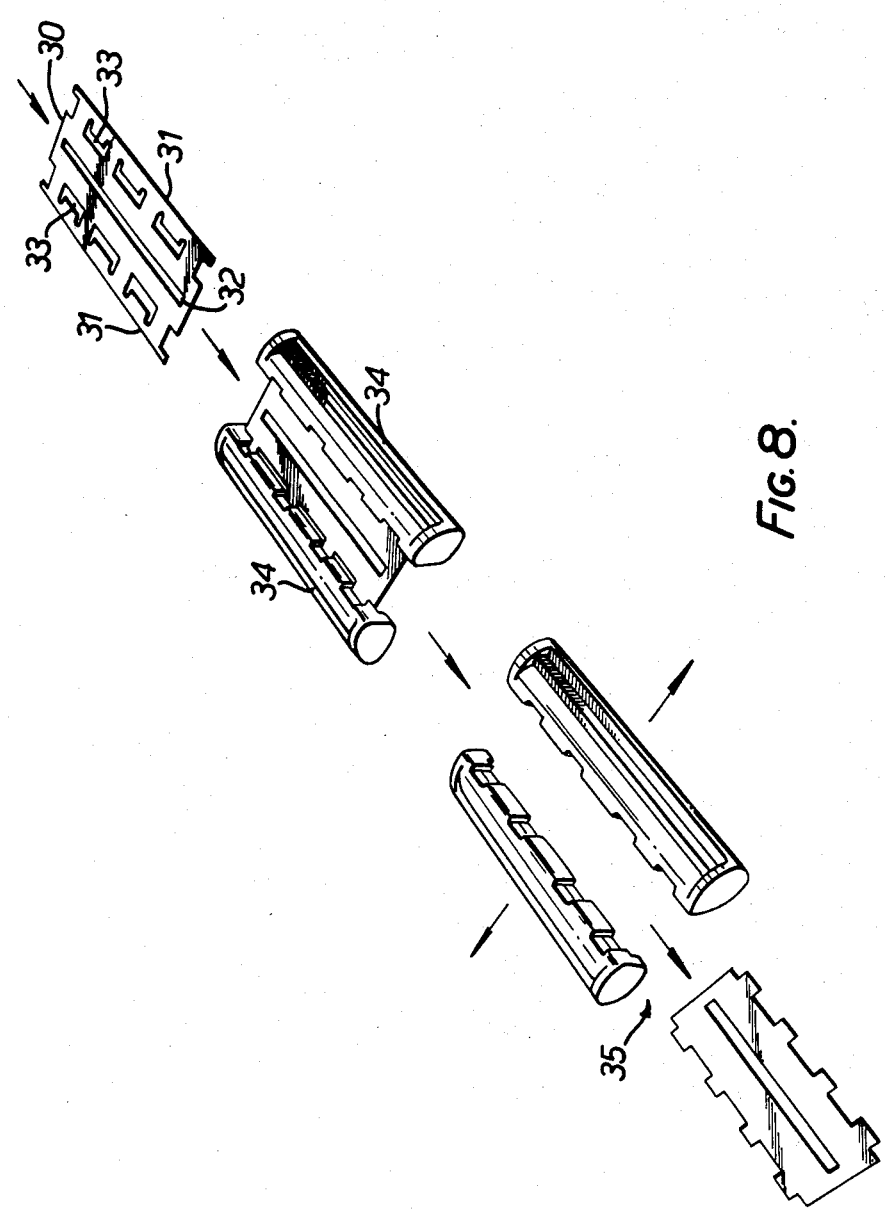
FIGS. 8, 9 and 10 are diagrammatic perspective views of the steps in three modified processes in accordance with the invention.

FIG. 8 illustrates a modified process, in this case for the manufacture of shaving units, which utilises, as its starting material, individual blades 30 each having two cutting edges 31. Each blade has a central elongate slot 32 running parallel to the blade edges and a series of perforations 33 located between the central slot and each cutting edge.

The blades are fed, in an end-to-end or edge-to-edge series, into a moulding machine where a guard bar and top cap are moulded on to each side of the blade as seen at 34, the central portion of the blade including the slot 32 being free from moulding material. This central portion is then cropped out, as seen at 35, to leave two oppositely-facing shaving units which can be sold as such or attached to handles before sale.

Figure 9:
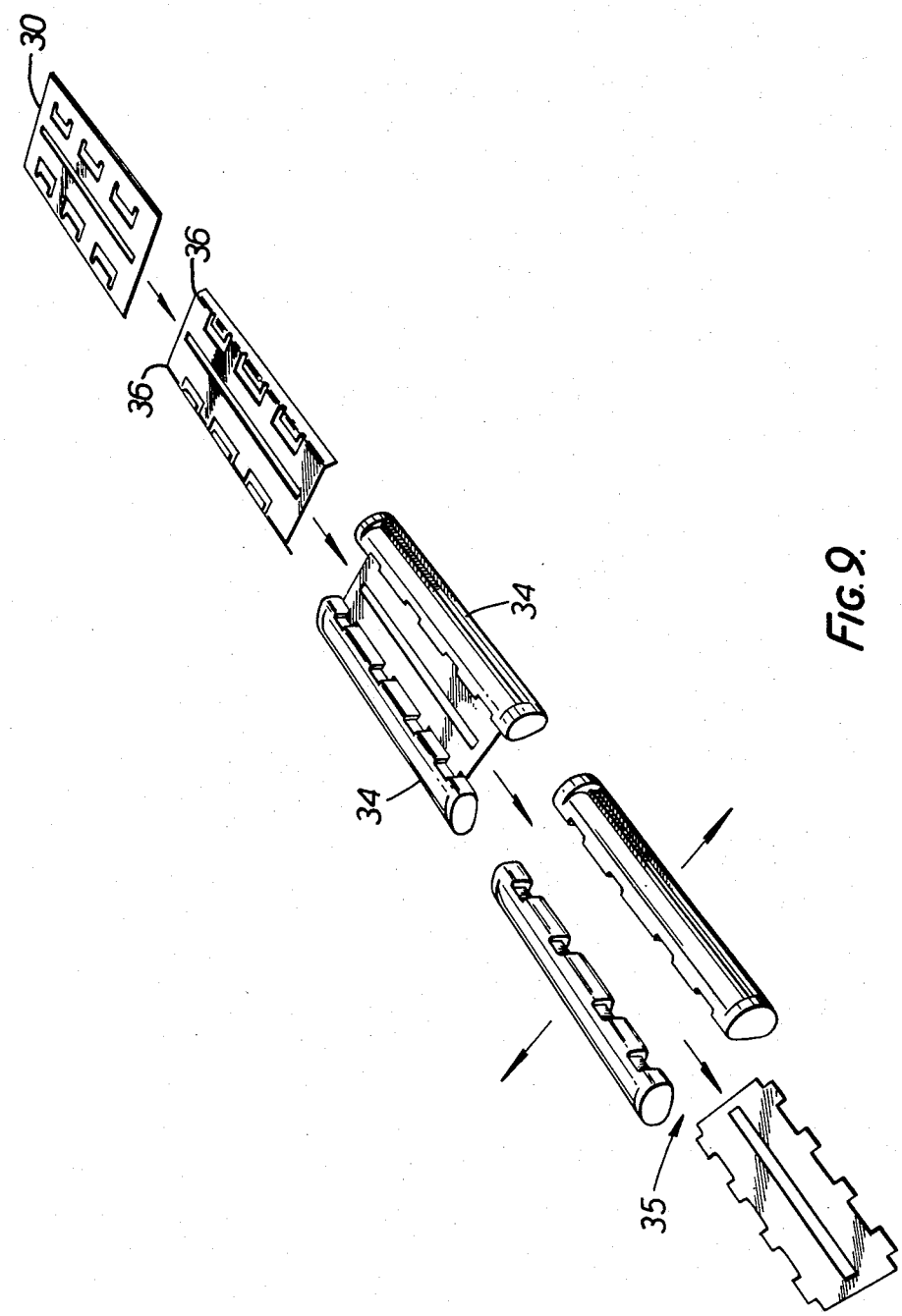

FIG. 9 shows a slight modification of the embodiment of FIG. 8 in which each blade 30 passes through an intermediate creasing stage in which the opposite edge portions of the blade are bent through an acute angle such as to leave a permanent crease running longitudinally of the blade to stiffen the blade. The creased blade is then fed into the moulding machine and other operations carried out as illustrated in FIG. 8.

Figure 10:
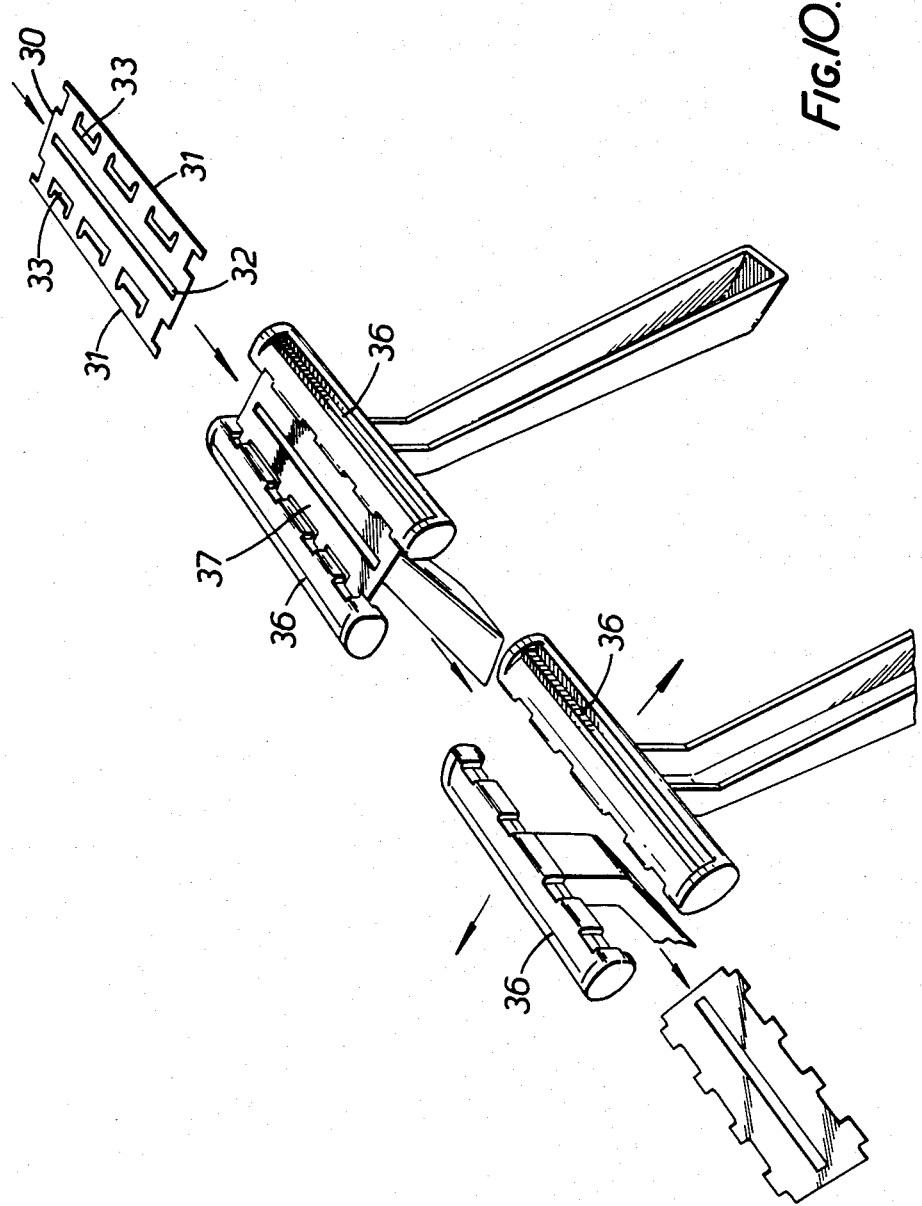

In the process illustrated in FIG. 10, the double-edged blades 30 are fed serially into a moulding machine in which there is moulded on to each side of the blade a guard bar, top cap and handle, so that the moulding emerging from the moulding stage comprises two complete razors each formed with an integral handle, guard bar and top cap, the two razors being interconnected by the portion of metal disposed between the side portions of the blade. In the next operation, this central portion of blade metal is cropped out to leave two complete razors.

Where reference has been made herein to a shaving unit, the part concerned could form a component of a larger shaving unit. For example a single bladed shaving unit formed as described above could form a component of a twin bladed shaving unit.

Although the present invention is concerned particularly with single-edged single or multiple bladed razors and shaving units, double-edged razors or shaving units could be made by moulding plastics material on to both cutting edges of the doubled-edged strip of blade metal.

I claim:

1. A process for the manufacture of razors or shaving units for razors, which comprises forming a strip of blade metal with at least two cutting edges, wherein the strip of blade metal is formed with a plurality of elongate aperatures extending along the strip, the blade edges being provided on portions of the strip which are separated from the remainder of the strip by webs extending between the aperatures, introducing the strip into a mold cavity and molding plastics material directly on to the strip to form the plastics portion of a razor or shaving unit on each cutting edge or on both cutting edges, the plastics portions being spaced apart, and cropping at least part of said webs to release the razors or shaving units from each other.

2. A process according to claim 1 wherein a single cutting edge is formed along at least one side of the strip of blade metal and individual cutting edges are formed from said cutting edge by cropping out portions of the edge of the strip at intervals along its length.

3. A process according to claim 1 wherein each web extends from a completed razor or shaving unit via a recess in the plastics molding and the cropping of the web takes place in said recess so that the cropped edge of the web is screened by the adjacent plastics material.

4. A process according to claim 1 wherein the blade strip is cropped to form shaving units each with at least one web of blade metal protruding therefrom by means of which the shaving unit can be secured to a razor handle.

* * * * *